United States Patent

[11] 3,588,534

[72] Inventors Robert J. Campbell;
Roland W. Koch, Cedar Rapids, Iowa

[21] Appl. No. 822,579
[22] Filed May 7, 1969
[45] Patented June 28, 1971
[73] Assignee Collins Radio Company
Dallas, Tex.

[54] PEAK-SLOPE FREQUENCY DISCRIMINATOR
14 Claims, 10 Drawing Figs.

[52] U.S. Cl. .......... 307/233, 307/242, 307/255, 307/261, 307/295, 307/296
[51] Int. Cl. .......... H03k 5/20
[50] Field of Search .......... 307/233, 242, 243, 244, 253, 254, 255, 261, 295, 296

[56] References Cited

UNITED STATES PATENTS

| | | | |
|---|---|---|---|
| 3,096,448 | 7/1963 | Stratos | 307/233 |
| 3,166,678 | 1/1965 | Fleshman et al. | 307/253X |
| 3,517,214 | 6/1970 | Boegeman | 307/233 |

*Primary Examiner*—John S. Heyman
*Attorneys*—Henry K. Woodward and Robert J. Crawford

ABSTRACT: Disclosed is a frequency dependent signal modification means which may function as a filter and which utilizes a signal differentiator and peak detector to control operation as a function of frequency.

INVENTORS.
ROBERT J. CAMPBELL
ROLAND W. KOCH
BY H. F. Woodward
ATTORNEY

*INVENTORS.*
*ROBERT J. CAMPBELL*
*ROLAND W. KOCH*
*BY* H. F. Woodward
*ATTORNEY*

PEAK-SLOPE FREQUENCY DISCRIMINATOR

This invention relates generally to discriminators, and more particularly to frequency discriminators and electrical signal modifiers such as filters and the like which perform a frequency dependent function.

Various functions in communications and control systems, such as filtering demodulation, frequency deviation prevention in FM systems, and the like, are frequency dependent. Filters, for example, whether lowpass, highpass, bandpass, or bandreject, may involve tuned passive reactive circuits or crystal and mechanical filters in the case of single sideband radio transmission which require sharp cutoff.

The present invention contemplates a new approach to providing frequency dependent functions through the use of signal slope differentiation and peak detection. For example, sharp cutoff and cut-on filters are provided which are substantially simpler and less expensive than mechanical and crystal filters.

Accordingly, an object of the invention is a peak-slope frequency discriminator.

Another object of the invention is a frequency dependent signal modification means utilizing frequency differentiation.

Still another object of the invention is filter means having relatively sharp cutoff and cut-on characteristics.

Yet another object of the invention is switch means which is actuated in response to signal frequency.

These and other objects and features of the invention will be apparent from the following description and appended claims when taken with the drawings, in which:

Figure 1:
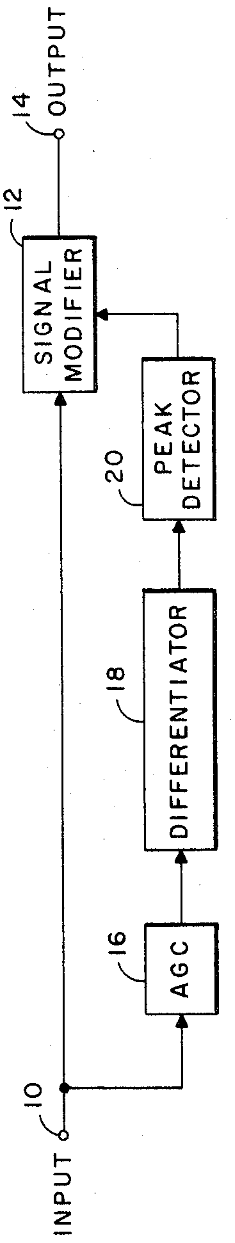
FIG. 1 is a functional block diagram of one embodiment of the invention.

Referring now to the drawings, FIG. 1 is a functional block diagram of one embodiment of the invention. An input signal applied at terminal 10 is fed to a signal modifier 12, which may be an attenuator, filter, switch, and the like, with the output of signal modifier 12 connected to an output terminal 14. The input signal at terminal 10 is also connected to an automatic gain control means 16 which functions to provide a constant peak amplitude signal to differentiator 18. Differentiator 18 differentiates the input signal thereto and provides a signal to peak detector 20 the peak amplitude of which is frequency dependent. For example, assuming that the constant peak amplitude signal, $V_{in}$, provided by automatic gain control 16 to differentiator 18 is of the form $$V_{in}=A \sin \omega t$$

where A is a constant then the output signal, $V_{out}$, from differentiator 18 theoretically is $$V_{out}=A\omega \cos \omega t$$

Thus, peak detector 20 detects the $A\omega$ peak amplitude of the signal applied thereto and, in response to a peak signal of a predetermined level, peak detector 20 applies a control signal to signal modifier 12.

As above stated, the signal modifier 12 may be an attenuator or other element the function of which may be controlled by a control signal. Assuming that the signal modifier is a switch, the circuit may perform a sharp cutoff lowpass filter function or a sharp cut-on highpass filter function as further illustrated below with respect to FIGS. 3—6.

Figure 2:
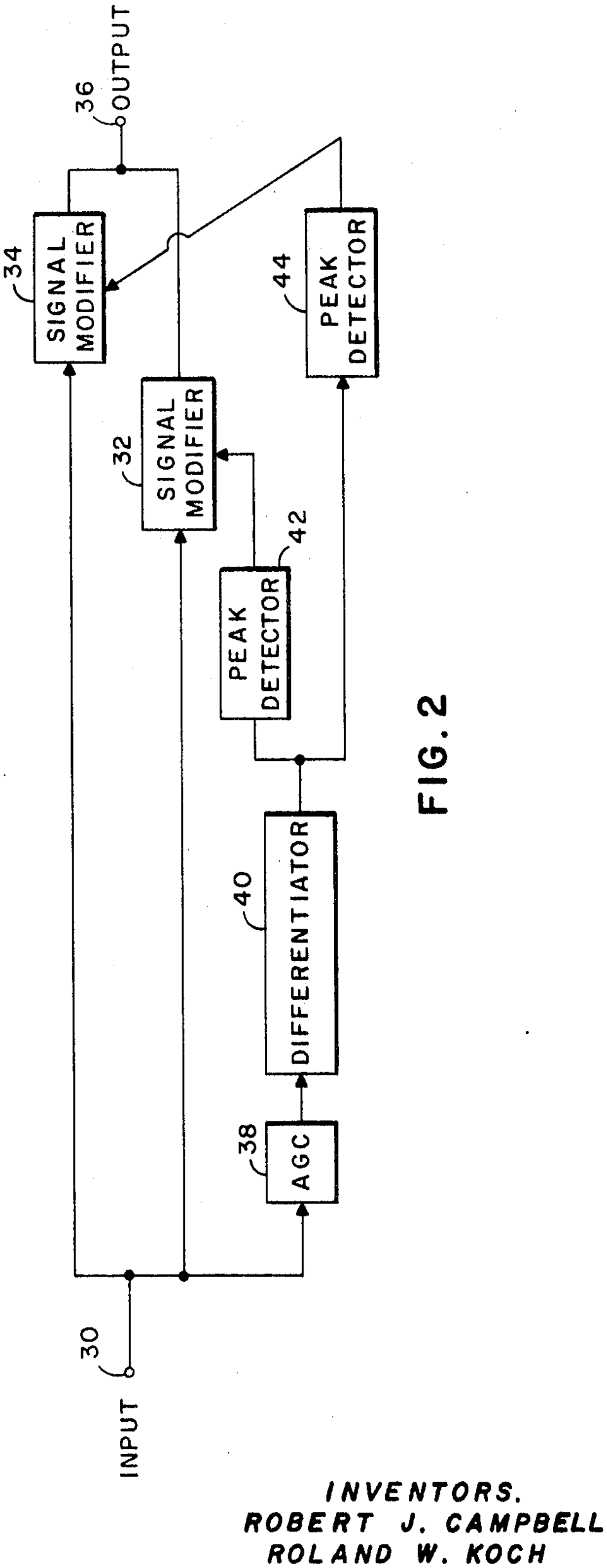
FIG. 2 is a functional block diagram of another embodiment of the invention.

FIG. 2 is another embodiment of the invention wherein the input signal applied at terminal 30 is fed to parallel connected switches 32 and 34 the outputs of which are connected to output terminal 36. Similar to the circuit FIG. 1, the input signal at terminal 30 is also passed to an automatic gain control circuit 38, the output of which is fed to differentiator 40. The differentiated output provided by differentiator 40 is then applied to peak detectors 42 and 44, the outputs of which are connected to and control switches 32 and 34, respectively.

Again, assuming signal modifiers 32 and 34 are switches, sharp cut-on and cutoff bandpass and bandreject filter functions may be provided as further illustrated below with respect to FIGS. 7—10.

Figure 3:
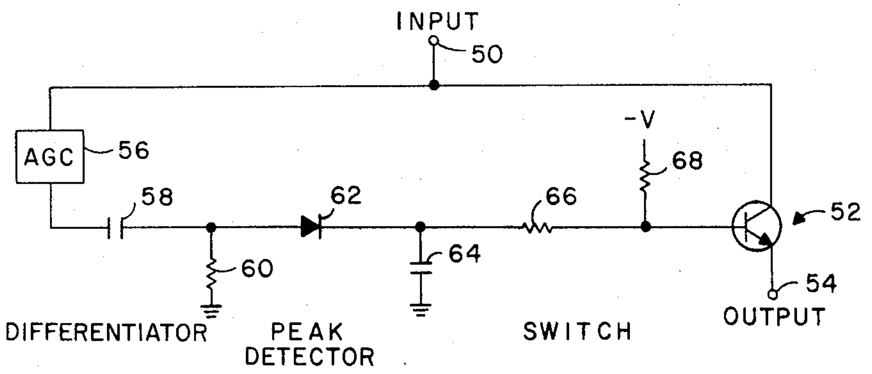
FIG. 3 is a schematic of an embodiment of the invention.

Consider now FIG. 3 which is a simplified partial schematic of the circuit illustrated in FIG. 1. The input signal applied at terminal 50 is connected through NPN transistor 52 to output terminal 54. The input signal is also connected through automatic gain control 56 to the signal differentiator comprising capacitor 58 and shunt resistor 60. The differentiated output is then passed to the peak detector comprising serially connected diode 62 and shunt capacitor 64. The output of the peak detector is applied through resistor 66 to the base electrode of transistor 52. Also connected to the base electrode of transistor 52 is a negative potential, −V, which is connected through resistor 68 to the base electrode.

Figure 4:
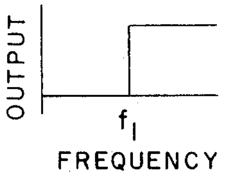
FIG. 4 is the frequency characteristic of the embodiment of FIG. 3.

The negative bias provided by the negative DC potential through resistor 68 reverse biases transistor 52 and, acting along, provides an open circuit between input terminal 50 and output terminal 54. However, when sufficient positive voltage is provided by capacitor 64 of the peak detector, the base of transistor 52 becomes forward biased and a closed circuit is provided between input terminal 50 and output terminal 54. It will be appreciated that the voltage level at which the transistor 52 becomes forward biased is dependent upon the voltage divider circuit comprising resistors 66 and 68. Also, as above described, the voltage level provided by the peak detector is frequency dependent, and the circuit of FIG. 3 thus has a frequency characteristic of a highpass filter as illustrated in FIG. 4 where $f_1$ represents the frequency at which the peak detector voltage is sufficient to forward bias transistor 52.

Figure 5:
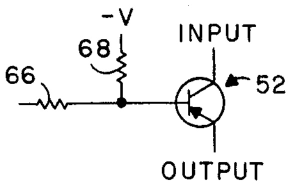
FIG. 5 is a schematic of another embodiment of the invention.
Figure 6:
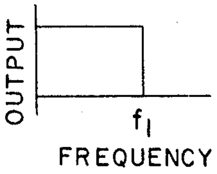
FIG. 6 is the frequency characteristic of the embodiment of FIG. 5.

FIG. 5 is a modification of the circuit of FIG. 3 which provides a lowpass filter function. In this embodiment it will be noted that transistor 52 is a PNP type, therefore the negative bias on the base element provided by the negative potential −V forward biases the transistor and at low frequencies the transistor provides a closed circuit between the input and output terminals. When sufficient positive voltage is provided by the peak detector to apply a positive potential on the base electrode of transistor 52 through the voltage divider network comprising resistors 66 and 68, the transistor becomes back-biased and nonconducting. Thus, as illustrated by the frequency characteristic of FIG. 6, at the predetermined frequency $f_1$ when the transistor 52 becomes back-biased an open circuit is provided between the input and output terminals, and a lowpass characteristic is provided.

Figure 7:
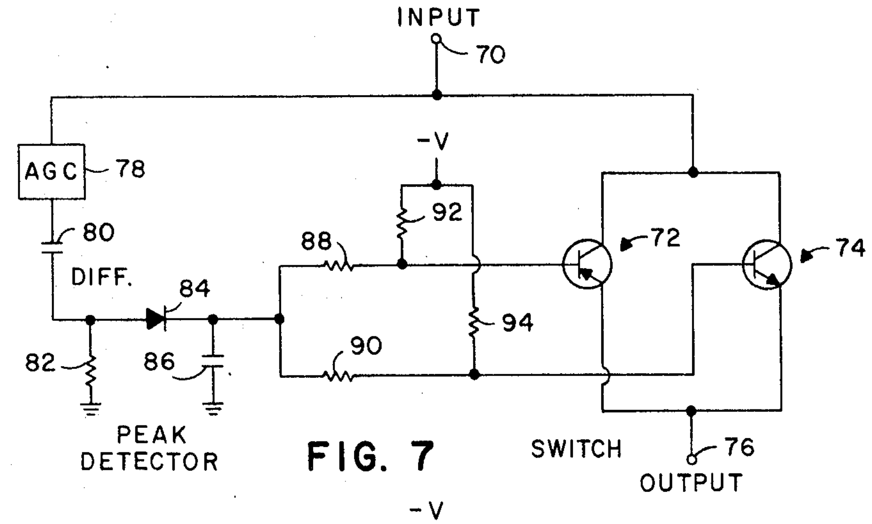
FIG. 7 is a schematic of another embodiment of the invention.
Figure 8:
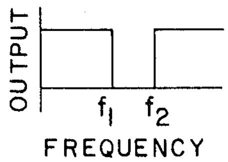
FIG. 8 is the frequency characteristic of the embodiment of FIG. 7.

FIG. 7 is a simplified schematic of the embodiment illustrated in FIG. 2. The input signal applied at terminal 70 is passed to the collector elements of parallel connected transistors 72 and 74, and the emitter electrodes of transistors 72 and 74 are connected to the output terminal 76. The input signal is also connected through automatic gain control 78 to the differentiator comprising serially connected capacitor 80 and shunt resistor 82. The output of the differentiator is passed to the peak detector comprising serially connected diode 84 and shunt capacitor 86. The output of the peak detector is connected through parallel resistors 88 and 90 to the base electrodes of transistors 72 and 74, respectively. Similar to the circuit embodiment of FIG. 3, a negative potential is connected through resistors 92 and 94 to the base electrodes of transistors 72 and 74, respectively.

Since transistor 72 is a PNP-type, the negative potential applied to its base electrode by negative potential −V tends to forward bias the transistor and provide a conductive path between the input terminal 70 and the output terminal 76. Similar to the circuit of FIG. 5, transistor 72 will become reverse biased at a frequency $f_1$ when the voltage from the peak detector is sufficient to reverse bias the transistor. Transistor 74, being of the NPN-type, is reverse biased by negative potential applied to its base electrode by the −V potential until sufficient positive voltage is provided by the peak detector at frequency $f_2$ to forward bias the transistor. By selectively designing the voltage divider comprising resistors 88 and 92 and the voltage divider comprising resistors 90 and 94, $f_2$ will be higher in frequency than $f_1$, and the circuit illustrated in FIG. 7 provides a bandreject function as illustrated in the frequency characteristic of FIG. 8.

Figure 9:
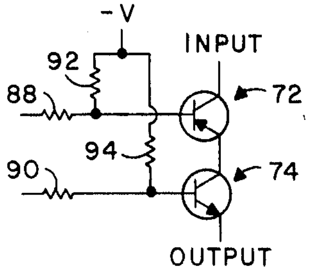
FIG. 9 is a schematic of another embodiment of the invention.
Figure 10:
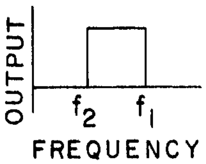
FIG. 10 is the frequency characteristic of the embodiment of FIG. 9.

FIG. 9 is a modification of the circuit of FIG. 7 wherein the transistors 72 and 74 are serially connected between the input and output terminals. In this embodiment, the frequency $f_1$ at which the normally conducting transistor 72 is reverse biased and cutoff is higher in frequency than the frequency $f_2$ at which the normally reverse biased and nonconducting transistor 74 is forward biased and turned on. Thus, in looking at the circuit between the input and output terminals, up to the frequency $f_2$ transistor 74 is nonconducting and thus opening the circuit. Between frequencies $f_2$ and $f_1$ both transistors 72 and 74 are conducting thus providing a closed circuit between the input and output terminal, and above the frequency $f_1$ transistor 72 is reverse biased and again an open circuit is provided between the input and output terminals. This band-pass frequency characteristic is illustrated in FIG. 10.

As above described, a frequency dependent signal modification means utilizing a peak-slope frequency discriminator is provided. The signal modification means has been further illustrated with respect to various filter functions, however the described embodiments are for illustration purposes only and are not to be construed as limiting the scope of the invention. Various modifications, applications, and changes may occur to those skilled in the art without departing from the spirit and scope of the invention.

We claim:

1. A frequency dependent signal modification means comprising an input terminal, an output terminal, signal modification means serially connecting said input and output terminals, said signal modification means having at least one control terminal to which a voltage may be applied to control the operation of said signal modification means, automatic gain control means connected to said input terminal to receive an input signal and provide a constant peak amplitude output signal, differentiator means connected to said automatic gain control means to receive and differentiate said constant amplitude output signal, peak detector means connected to said differentiator means to receive the differentiated output signal therefrom, whereby the output of said peak detector is proportional in amplitude to the frequency of said input signal, and means connecting the output of said peak detector means to said control terminal.

2. A frequency dependent signal modification means as defined by claim 1 wherein said signal modification means includes a transistor.

3. A frequency dependent signal modification means as defined by claim 2 wherein said control terminal is the base electrode of said transistor and said signal modification means further includes biasing means and voltage divider means connecting said biasing means and said peak detector means to said base electrode.

4. A frequency dependent signal modification means as defined by claim 3 wherein said biasing means tends to forward bias said transistor and said signal modification means performs a lowpass filter function.

5. A frequency dependent signal modification means as defined by claim 3 wherein said biasing means tends to reverse bias said transistor and said signal modification means performs a highpass filter function.

6. A frequency dependent signal modification means as defined by claim 1 wherein said signal modification means includes two parallel connected transistors of NPN and PNP types, respectively, and the base electrodes of said transistors are first and second control electrodes.

7. A frequency dependent signal modification means as defined by claim 6 wherein said signal modification means further includes biasing means and voltage divider means connecting said biasing means and said peak detector means to said first and second control electrodes.

8. A frequency dependent signal modification means as defined by claim 1 wherein said signal modification means includes two series connected transistors of NPN and PNP types, respectively, and the base electrodes of said transistors are first and second control electrodes.

9. A frequency dependent signal modification means as defined by claim 8 wherein said signal modification means further includes biasing means and voltage divider means connecting said biasing means and said peak detector means to said first and second control electrodes.

10. A frequency dependent signal modification means comprising an input terminal, an output terminal, transistor means connecting said input and output terminals, said transistor means including at least one control terminal to which a voltage may be applied to control the operation of said transistor means, gain control means connected to said input terminal to receive an input signal and provide a constant peak amplitude output signal, differentiator means connected to said gain control means to receive and differentiate said constant amplitude output signal, peak detector means connected to said differentiator means to receive the differentiated output signal therefrom, and means connecting said peak detector means to said control terminal.

11. A frequency dependent signal modification means as defined by claim 10 wherein said transistor means functions as a lowpass filter.

12. A frequency dependent signal modification means as defined by claim 10 wherein said transistor means functions as a highpass filter.

13. A frequency dependent signal modification means as defined by claim 10 wherein said transistor means functions as a bandpass filter.

14. A frequency dependent signal modification means as defined by claim 10 wherein said transistor means functions as a bandreject filter.